United States Patent [19]

Sheynblat

[11] Patent Number: 5,450,448
[45] Date of Patent: Sep. 12, 1995

[54] REMOVAL OF SIGNAL ERRORS FOR DIFFERENTIAL SATELLITE POSITIONING SYSTEMS

[75] Inventor: Len Sheynblat, Belmont, Calif.

[73] Assignee: Trimble Navigation Limited, Sunnyvale, Calif.

[21] Appl. No.: 55,535

[22] Filed: Apr. 30, 1993

[51] Int. Cl.⁶ .......................... H03D 1/04; H03D 1/06
[52] U.S. Cl. ..................... 375/346; 342/358; 455/12.1; 370/104.1
[58] Field of Search ................. 375/99; 342/357, 358, 342/356; 364/443, 444, 449, 549; 455/12.1, 13.1; 370/104.1

[56] References Cited

U.S. PATENT DOCUMENTS 4,652,884  3/1987  Starker ............................... 342/357
4,860,317  8/1989  Tomlinson ..................... 455/12.1 X
5,155,490  10/1992 Spradley, Jr. et al. ............ 342/357

OTHER PUBLICATIONS

Sennot et al. "Multipath Sensitivity & Carrier Slip Tolerance of An Intergrated Doppler DGPS Navigation Algorithm", IEEE Plans '90: Position location & Navigation.
Symposium Record. "The 1990's—A Decade of Excellence in the Navigation Sciences."pp. 638–644.

Primary Examiner—Stephen Chin
Assistant Examiner—Bryan E. Webster
Attorney, Agent, or Firm—John Schipper

[57] ABSTRACT

Method and apparatus for reducing the contributions of receiver noise signal error and multipath signal error from signals received in a Satellite Positioning System (SATPS) from one or more SATPS satellites by formation and appropriate filtering of differences of signals DD that are differences of SATPS signals received by the SATPS receiver/processor. A difference signal DD of code-phase-derived delta range signals and carder-phase-derived delta range signals is formed, and this difference signal is passed through a first statistical processing filter with an associated time constant $\tau 1$ in the approximate range 50–500 sec, to produce smoothed or filtered signal with the estimated receiver noise error reduced or removed. The difference signal DD is passed through second and third statistical processing filters having associated time constants $\tau 2 = 5$–$20$ sec and $\tau 3 = 50$–$500$ sec, and the difference of the output signals of the second and third statistical processing filters is formed and subtracted from DD to form a new difference signal. This new difference signal is passed through a fourth statistical processing filter with an associated time constant $\tau 4 = 50$–$500$ sec, to produce a smoothed or filtered signal with the estimated multipath signal error and estimated receiver noise error reduced or removed.

19 Claims, 9 Drawing Sheets

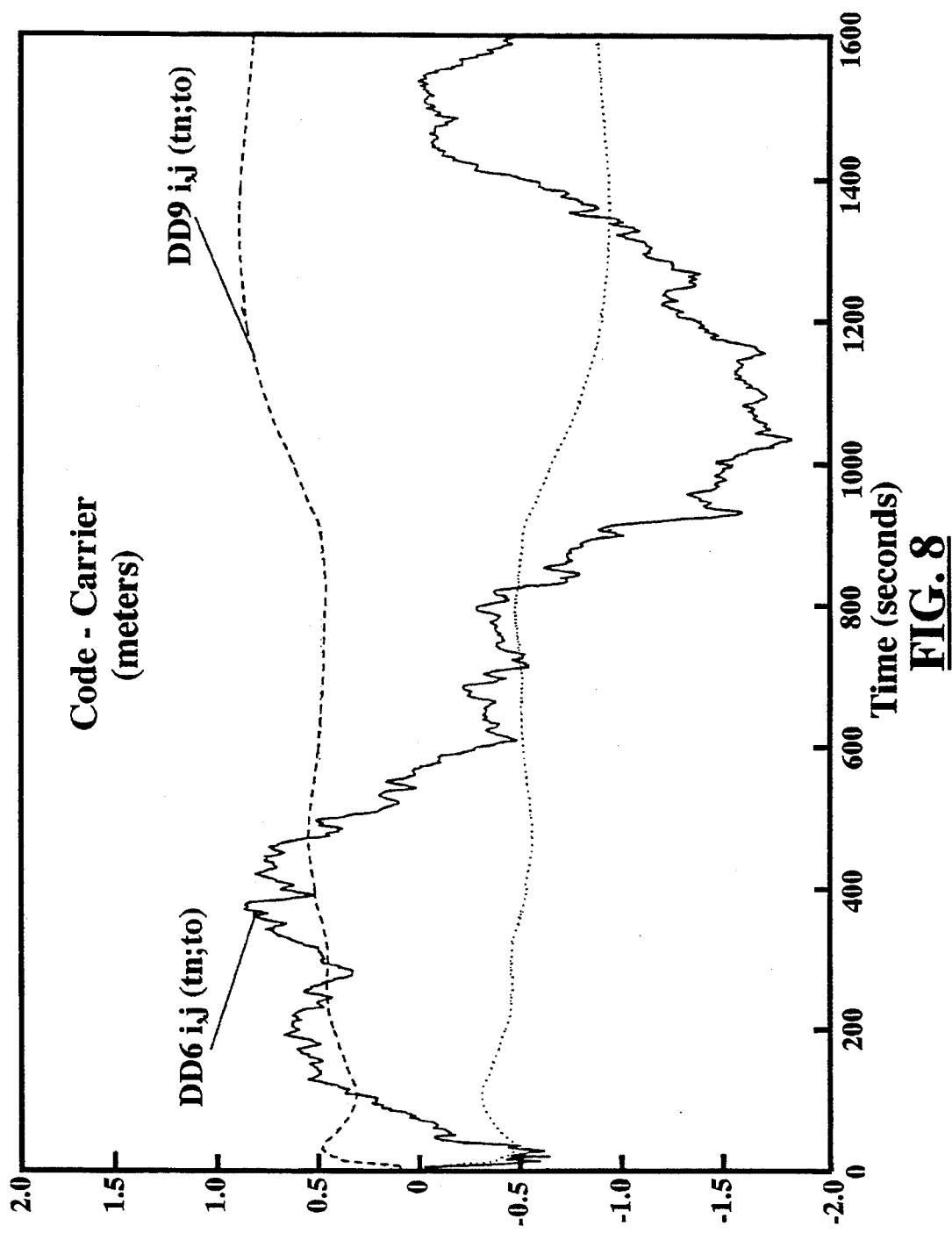

REMOVAL OF SIGNAL ERRORS FOR DIFFERENTIAL SATELLITE POSITIONING SYSTEMS

FIELD OF THE INVENTION

This invention relates to Satellite Positioning Systems (SATPS), and more particularly to determination of signal errors present in differential corrections and position calculations.

BACKGROUND OF THE INVENTION

The NAVSTAR Global Positioning System (GPS), developed and implemented by the U.S. Department of Defense, uses position and time information broadcast from a constellation of up to 24 satellites, moving in non-geosynchronous orbits, to allow determination of the present time and observer location and velocity adjacent to the Earth's surface.

Several workers have proposed approaches for reducing or removing multipath signal errors. Lakatos, in U.S. Pat. No. 3,537,008, distinguishes between a direct or "specular" path from transmitter to receiver and one or more "echo" paths that provide multipath signals for that transmission. A modulated pilot signal is transmitted together with a message signal, and arrival of the known modulated signal is continuously monitored at the receiver. The modulated signal is of finite length and acts as a timing signal to open and close a gate at the receiver. The contemporaneously transmitted direct signal is admitted through the gate, but later arriving echo signals are not admitted. This system uses two parallel signal processing paths at the receiver, one path containing a phase locked loop for recognition of the modulated signal. If an echo signal arrives before the receiver gate closes, a portion of the echo signal will also be admitted and treated as part of the direct message signal.

Decomposition of the arriving signal into selected contiguous but nonoverlapping frequency intervals to reduce multipath signal error is disclosed in U.S. Pat. No. 3,542,954, issued to Flanagan. The transmitted direct signal and any echo signals are received and normalized at a plurality of spaced apart transducers, at each of which this frequency decomposition occurs. Among the transducers, the maximum signal in each frequency interval is chosen, and a composite direct signal at the intended receiver is constructed from this maximum signal set.

U.S. Pat. No. 3,566,035, issued to Noll et al, discloses use of the "complex cepstrum" (Fourier transform of the logarithm of the power spectrum plus phase angle) of short time interval, partly overlapping segments of a transmitted signal to determine periodicity or aperiodicity of a received signal. Flanagan discloses application of the cepstrum function to multipath signal suppression, in U.S. Pat. No. 3,662,108. The complex cepstrum of a received composite signal is formed, and the inverse Fourier transform of the real part of the cepstrum is computed. This inverse transform signal is clipped about a selected center to remove some distortion components, and the remaining "mountain top" signal has a sequence of maxima at time values corresponding to arrival of the desired signal and undesired multipath replicas at the receiver.

Menard discloses a multipath time delay and correlation bandwidth analyzer system in U.S. Pat. No. 3,596,182. A correlation function is formed between a signal received at the receiver and a selected reference signal generated at the receiver. If the received signal contains strong multipath contributions, displaced in time from each other, the correlation function will contain two or more correlation pulses or maxima, also displaced in time. The reference signal can be a time delayed replica of the received signal.

U.S. Pat. No. 3,605,018, issued to Coviello, discloses a nonlinear signal processing system useful for suppressing strong multipath signals in a quaternary phase, spread spectrum communications system. A received composite signal, containing the desired signal and a superimposed strong multipath signal, is passed through a circuit containing a signal envelope detector and a signal averager, arranged in parallel. The envelope detector and signal averager output signals are applied to two terminals of a differential amplifier. The diff amp output signal is an estimate of the desired signal.

A system for quantitatively measuring multipath signal distortion is disclosed by Close in U.S. Pat. No. 3,869,673. A local oscillator, mixer and amplitude limiter are applied to a received signal to provide a first signal representing frequency variation and a second signal representing amplitude variation of the received signal. A correlation signal formed from the product of these first and second signals is a quantitative measure of multipath distortion present in the received signal.

Costas discloses apparatus for minimization of distortion in signals containing multipath signals and Doppler shift effects in U.S. Pat. No. 4,349,915. Signal arrival delay, such as produced by multipath signals, is determined by examining a selected frequency contribution of spaced apart pulses that arrive at the receiver.

Gutleber, in U.S. Pat. No. 4,457,007, discloses a multipath signal interference reduction system in which a plurality of replicas of the received signal, with different time delays, amplitudes and signal widths, are sequentially subtracted from the arriving composite signal (desired signal plus multipath signals) to produce a new composite signal with markedly reduced multipath signal contribution.

An adaptive multipath distortion equalizer, disclosed by Nossen in U.S. Pat. No. 4,669,091, uses simulation of the multipath distortion, based upon the composite signals received. After this multipath distortion signal is estimated, this distortion signal is subtracted from the composite signal received to produce an estimate of the desired signal. This approach uses time delay lines, amplitude scale factors and phase adjustments to obtain the estimated multipath distortion signal.

In U.S. Pat. No. 4,672,638, Taguchi et al disclose a multipath signal canceller that uses an envelope detector to determine the shape of a received composite pulse. This shape is compared with the shape of an undistorted pulse (earliest arriving pulse) stored in the receiver. The difference between these two shapes is used to construct a distortion-cancelling signal for signals that subsequently arrive at the receiver.

A method for multipath signal suppression in television receivers, disclosed by David Koo in U.S. Pat. No. 5,111,298, uses transmission of a test signal that is sampled and transformed to the frequency domain. Portions of the frequency spectrum are redistributed to other frequency ranges where the spectrum amplitude is nearly zero, and the redistributed spectrum is transformed back to the time domain to produce a processed signal where echo signal contributions are suppressed.

Koo discloses another method for echo signal cancellation in television receivers in U.S. Pat. No. 5,121,211, again working with the frequency domain transform of a received test signal.

These approaches often require extensive post-processing and use mathematically complex manipulations that are not consistent with the requirements for real time processing of signals received at high data rates.

What is needed is a method for reducing or eliminating the error contributions from multipath signals and from receiver noise by parallel, real time processing of signals derived from the GPS (or, more generally, SATPS) signals received from the SATPS satellites.

SUMMARY OF THE INVENTION

These needs are met by the invention, which provides method and apparatus for receiving and processing SATPS signals and generating differential SATPS corrections, in parallel and in real time, to reduce or remove the amplitudes of the signal errors due to receiver noise and due to multipath signal arrival. The multipath signal error contribution and receiver noise error contribution are separately determined by appropriate filtering of certain double differences of the code phase and carrier phase signals. Suitable filters for this procedure include the Morrison filter, the Hatch filter, the Kalman filter, and any of a class of positive, monotonic filters with a finite width filter window as set forth below.

A difference signal DD of code-phase-derived delta range signals and carrier-phase-derived delta range signals is formed, and this difference signal is passed through a first statistical processing filter with an associated time constant $\tau 1$ in the approximate range 50–500 sec (with a preferred value of 100 sec), to produce smoothed or filtered signal with receiver noise error reduced or removed. The difference signal DD is passed through second and third statistical processing filters having associated time constants $\tau 2 = 5$–20 sec and $\tau 3 = 50$–500 sec (with a preferred value of 300 sec), and the difference of the output signals of the second and third low pass filters is formed and subtracted from DD to form a new difference signal. This new difference signal is passed through a fourth statistical processing filter with an associated time constant $\tau 4 \approx \tau 1$ to produce a smoothed or filtered signal with the estimated multipath signal error and receiver noise error reduced or removed.

BRIEF DESCRIPTION OF THE DRAWINGS

FIG. 8 is a graphical view showing the intermediate SATPS difference signal $DD6_{i,j}(t_n;t_0)$ superimposed on a variance signal $DD9_{i,j}(t_n;t_0)$.

DESCRIPTION OF BEST MODE OF THE INVENTION

Figure 1:
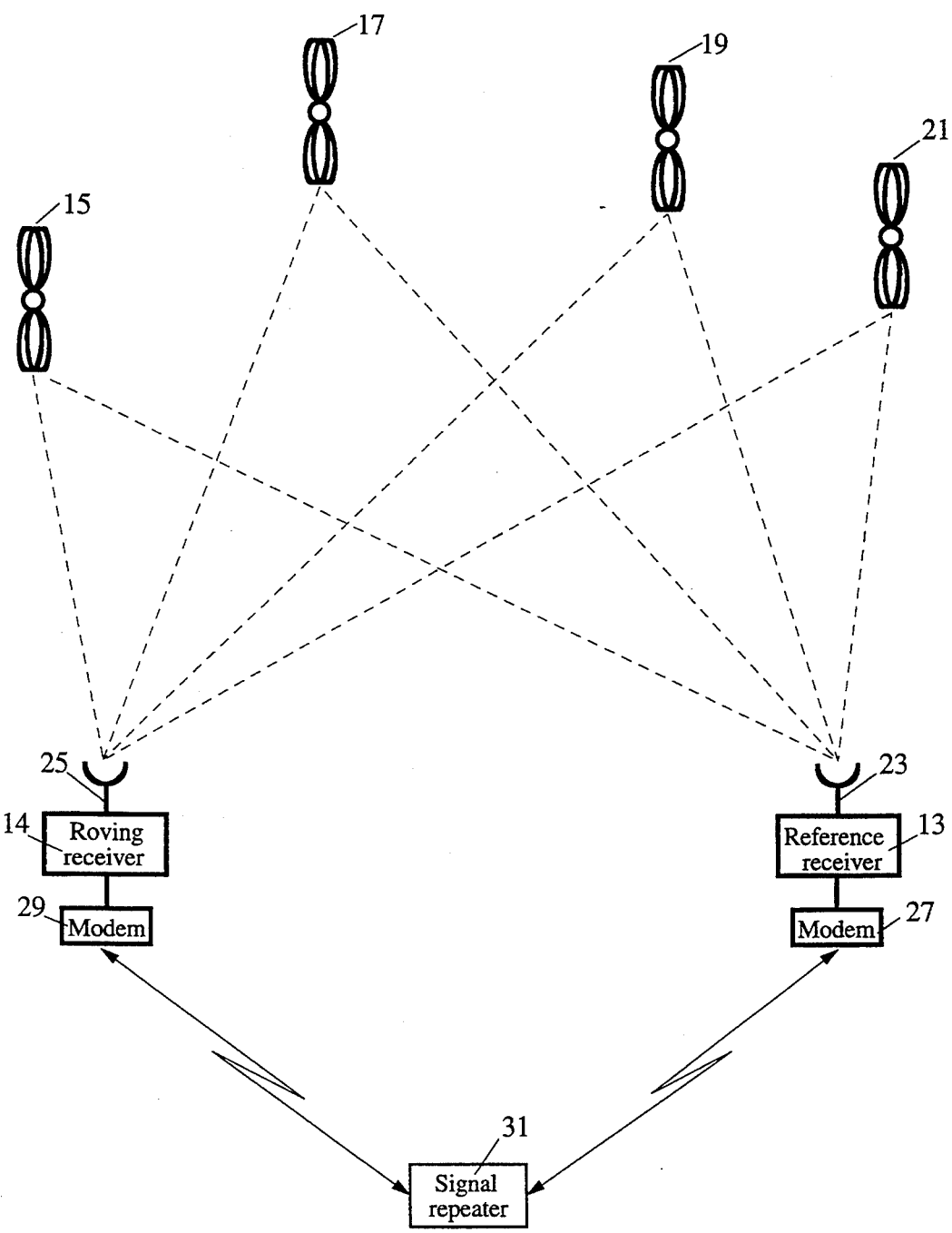
FIG. 1 is a schematic view of a suitable configuration of SATPS satellites and two ground receivers in which location, velocity and/or local time of a roving receiver can be determined using differential positioning techniques (DSATPS).

FIG. 1 illustrates a situation in which a differential SATPS may be used and enhanced by the invention. A reference SATPS receiver/processor and associated SATPS antenna ("reference station") 13 and a roving SATPS receiver/processor and associated SATPS antenna ("roving station") 14 are spaced apart on or adjacent to the Earth's surface, where it is assumed that the reference receiver's location is known very accurately at any time. The reference station 13 may be stationary or may be moving with location coordinates known as functions of time t. Four or more SATPS satellites 15, 17, 19 and 21 transmit SATPS signals that are received by the reference and roving stations 13 and 14 and converted to present location, velocity and time of that station. The reference and roving stations 13 and 14 also include modems 27 and 29, respectively, or other radio wave communication means that provide a one-way link from the reference station 13 to the roving station 14 or a two-way link, as shown. Optionally, the system shown in FIG. 1 may also include one or more signal repeaters 31, located between the two stations 13 and 14, to facilitate long distance or non-line-of-sight communication between these two stations.

The unprocessed SATPS signals $M_{i,j}(t)$ (i=13, 14; j=15, 17, 19, 21) received by station number i from satellite number j include information on the pseudorange $PR_{i,j}(t)$ and on the carrier phase $\Phi_{i,j}(t)$ for station i at a given time t. The signal $PR_{i,j}(t)$ includes a code signal that is specific for satellite number j plus error contributions, including receiver noise error $\eta_{i,j}(t)$, multipath signal error $m_{i,j}(t)$, satellite clock bias error $SCB_j(t)$, receiver clock bias error $RCB_i(t)$, troposphere signal propagation delay error $TR_{i,j}(t)$, ionosphere signal propagation delay $IO_{i,j}(t)$, and residual errors that are assumed to be small enough to be ignored here. The subscripts that appear with each of these error contributions indicate whether the error depends upon the station (i), the satellite (j), or both. The signal $\Phi_{i,j}(t)$ is obtained from analysis of integrated Doppler shifts of the SATPS signals received and includes error contributions from receiver noise, multipath signal error, satellite clock bias error, and troposphere and ionosphere signal propagation delays. Additionally, the signal $\Phi_{i,j}(t)$ includes a phase integer, $N_{i,j}$, whose value is initially ambiguous but does not change with time as long as continuous carrier lock is maintained. The pseudorange (code phase) signals and carrier phase signals may be expressed in equivalent length units as $$PR_{i,j}(t)=R_{i,j}(t)+SCB_j(t)+RCB_{i,j}(t)+TR_{i,j}(t)+I-O_{i,j}(t)+m_{i,j}(t)+\eta_{i,j}(t), \quad (1)$$

$$\Phi_{i,j}(t)=\lambda N_{i,j}(t)+R_{i,j}(t)+SCB_j(t)+RCB_{i,j}(t)+TR_{i,j}(t)-IO_{i,j}(t)+m'_{i,j}(t)+\eta'_{i,j}(t), \quad (2)$$

where $R_{i,j}(t)$ ("SATPS range") represents the range from the station number i to the satellite number j at the time t, as determined from SATPS navigation ephemeris (or almanac information) received by the reference station 13, and $\lambda$ is the SATPS carrier signal wavelength. Here, the multipath signal error contributions $m_{i,j}(t)$ and $m'_{i,j}(t)$ and the receiver noise error contributions $\eta_{i,j}(t)$ and $\eta'_{i,j}(t)$ can be different for the pseudorange and carrier phase, but the following relations are expected to hold generally:

$$|m'_{i,j}(t)|<<|m_{i,j}(t)|, \quad (3)$$

$$|\eta'_{i,j}(t)|<<|\eta_{i,j}(t)|. \quad (4)$$

Two new difference signals are then formed, $$\Delta PR_{i,j}(t;t_0)=PR_{i,j}(t)-PR_{i,j}(t_0) \quad (5)$$

$$\Delta\Phi_{i,j}(t;t_0)=\Phi_{i,j}(t)-\Phi_{i,j}(t_0), \quad (6)$$

which are sometimes referred to as the code-phase-derived delta range and the carrier-phase-derived delta range, respectively. It is also possible to set the initial values $PR_{i,j}(t_0)$ and $\Phi_{i,j}(t_0)$ equal to arbitrary numbers, such as zero. The phase integer ambiguity $\lambda N$ cancels in the carrier-phase-derived delta range $\Delta\Phi_{i,j}(t;t_0)$ in Eq. (6). A third difference signal $$\begin{aligned}DD_{i,j}(t;t_0) &= \Delta PR_{i,j}(t;t_0) - \Delta\Phi_{i,j}(t;t_0) \\ &= (m_{i,j}(t) - m_{i,j}(t_0)) - (m_{i,j}'(t) - m_{i,j}'(t_0)) + \\ &\quad (\eta_{i,j}(t) - \eta_{i,j}(t_0)) - (\eta_{i,j}'(t) - \eta_{i,j}'(t_0)) \\ &\approx (m_{i,j}(t) - m_{i,j}(t_0)) + (\eta_{i,j}(t) - \eta_{i,j}(t_0))\end{aligned} \quad (7)$$

sometimes called a "code-carrier" signal, is then formed and used to separately determine the multipath signal error and receiver noise error contributions.

Figure 2:
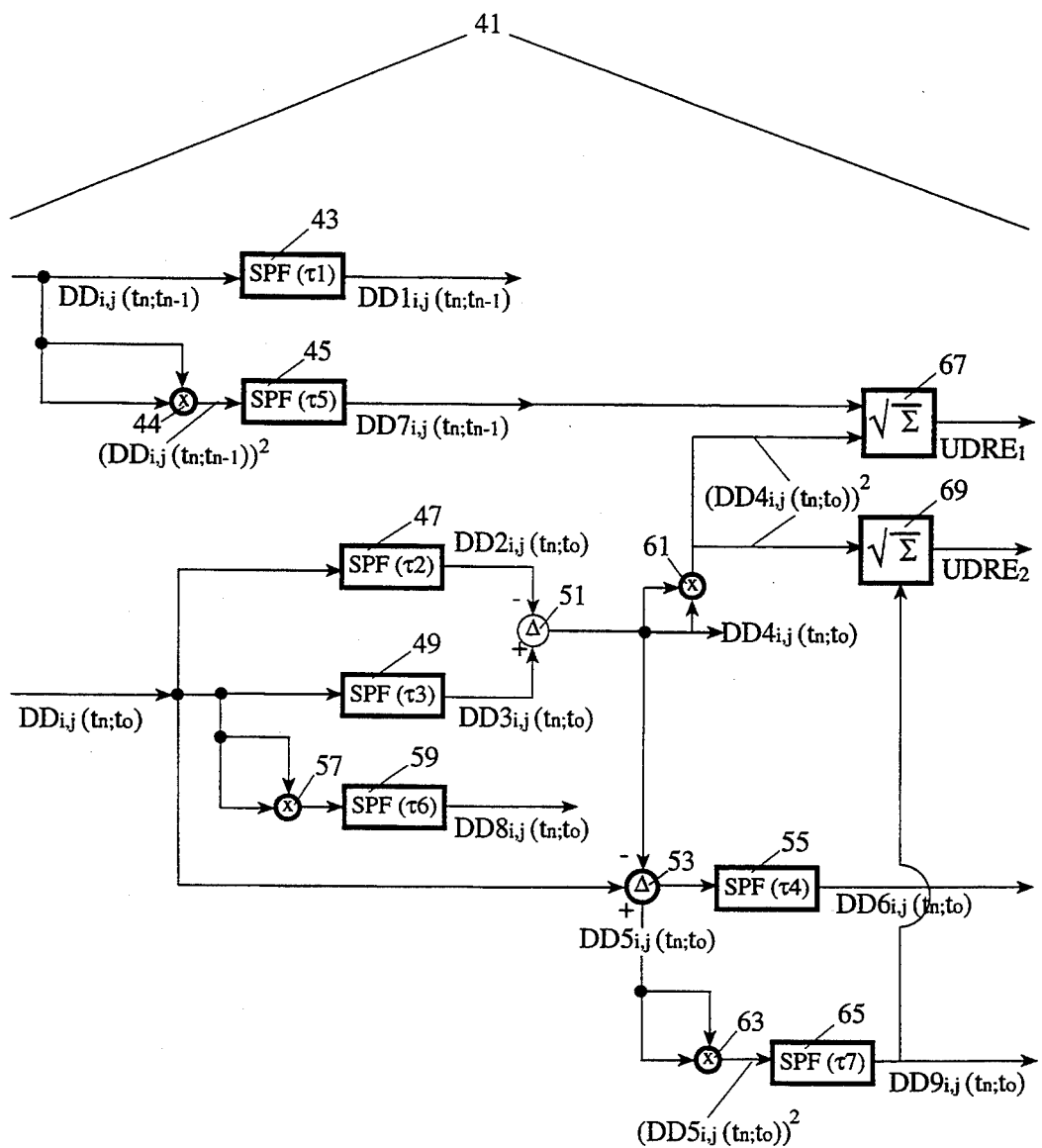
FIG. 2 is a schematic view of apparatus suitable for practicing the invention.

FIG. 2 illustrates apparatus 41 suitable for determination of these two error contributions. An SATPS difference signal $DD_{i,j}(t_n;t_{n-1})$ is formed for a sequence of distinct, consecutive sampling times $t_n$ (with sampling time difference $t_n-t_{n-1}=\Delta t_s \approx 1$ sec) and is passed through a first statistical processing filter (SPF) 43 having a frequency break point f1, with a corresponding first time constant $\tau 1=1/f1$ of the order of 50–500 sec ($\tau 1=100$ sec preferred). This produces a first output signal $DD1_{i,j}(t_n;t_{n-1})$ at the first LPF 43 that has little or no contribution from multipath signal error and contains primarily the receiver noise error contribution. The time difference $\Delta t_s=t_n-t_{n-1}$ can be chosen anywhere in an approximate range 0.1–5 sec.

Figure 3:
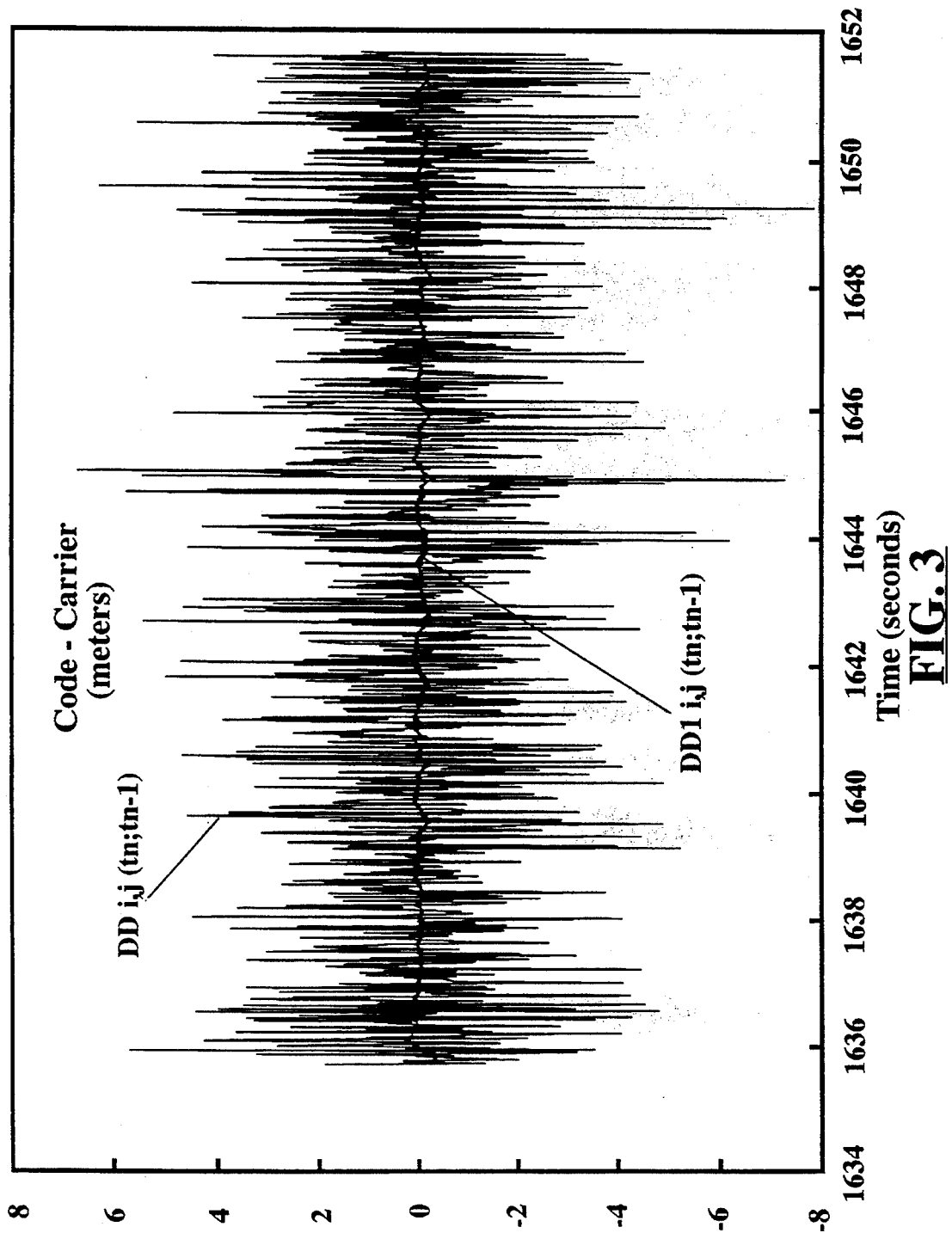
FIGS. 3 and 4 are respective graphical views showing an original SATPS difference signal $DD_{i,j}(t_n;t_{n-1})$ superimposed on a filtered mean value $DD1_{i,j}(t_n;t_{n-1})$ and on a corresponding filtered variance $DD7_{i,j}(t_n;t_{n-1})$, provided by the invention for reduction or removal of receiver noise error.
Figure 4:
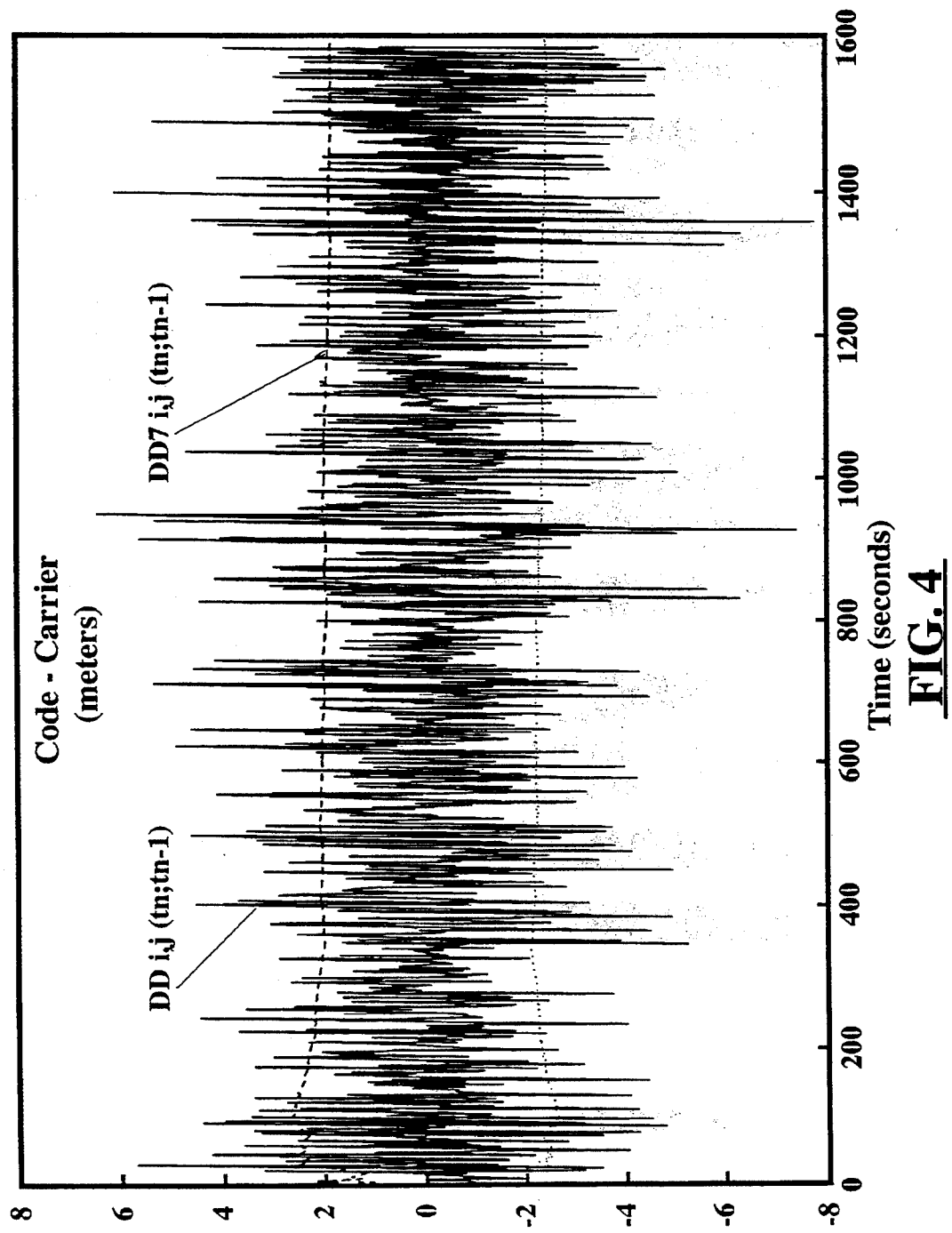

Optionally, the SATPS difference signal $DD_{i,j}(t_n;t_{n-1})$ is also squared in a product module 44 and passed through an SPF 45, having an associated time constant $\tau 5 \approx \tau 1$, to produce an output signal, denoted $DD7_{i,j}(t_n;t_{n-1})$ in FIG. 2. The filtered difference signals $DD1_{i,j}(t_n;t_{n-1})$ and $DD7_{i,j}(t_n;t_{n-1})$ represent a statistically-determined running estimate mean and running estimate variance (square of the standard deviation), respectively, of the input signal $DD_{i,j}(t_n;t_{n-1})$. FIGS. 3 and 4 are graphical views of the signals $DD_{i,j}(t_n;t_{n-1})$, $DD1_{i,j}(t_n;t_{n-1})$ and $DD7_{i,j}(t_n;t_{n-1})$, respectively, for a typical sequence of SATPS sample values. Multipath error is largely, if not completely, removed here by use of a difference signal $DD_{i,j}(t_n;t_{n-1})$ with a small time difference $\Delta t_s=t_n-t_{n-1}$.

Figure 5:
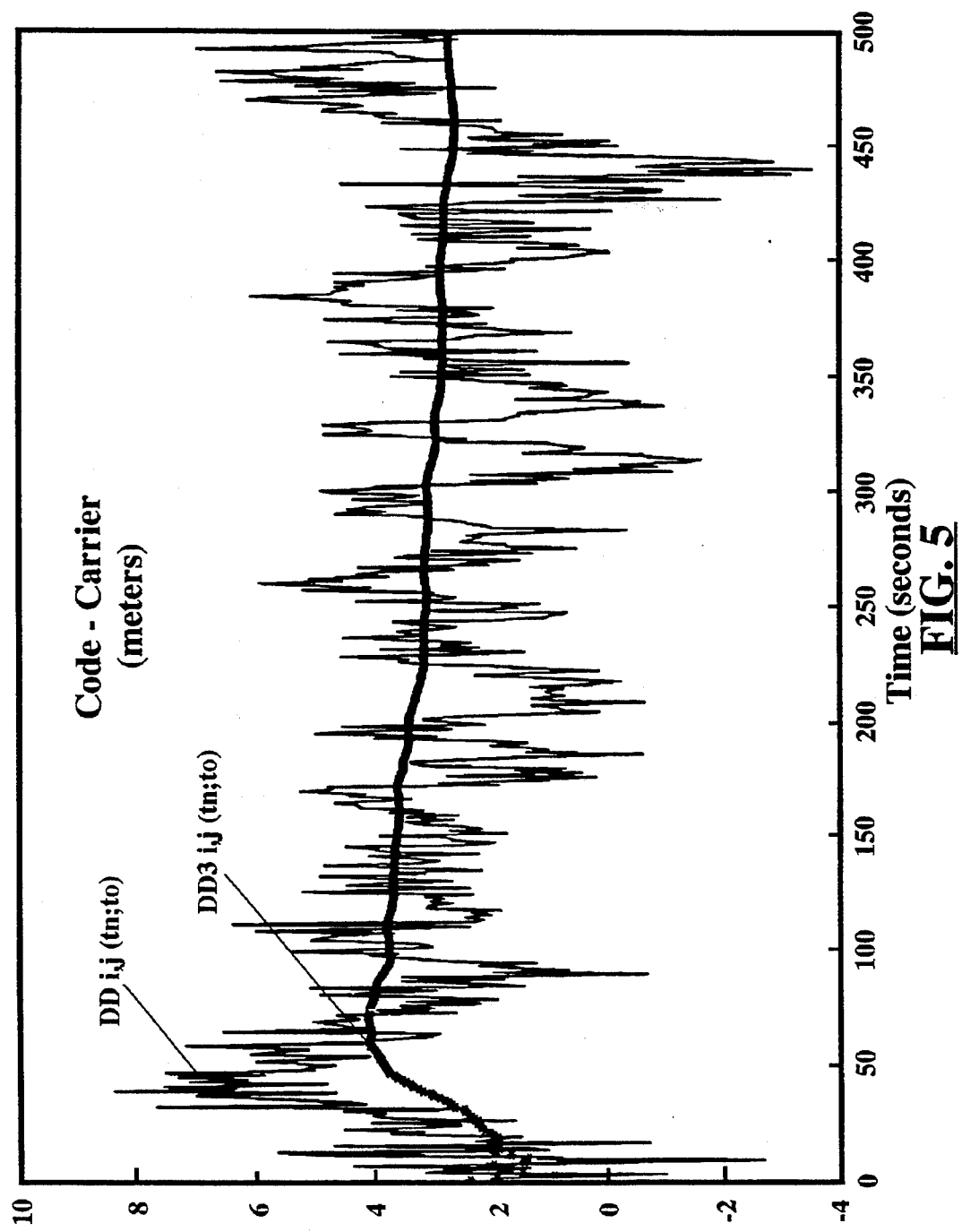
FIGS. 5 and 6 are respective graphical views showing an original SATPS difference signal $DD_{i,j}(t_n;t_0)$ superimposed on an intermediate running estimate mean value $DD3_{i,j}(t_n;t_0)$ and on a corresponding intermediate running estimate variance $DD8_{i,j}(t_n;t_0)$ produced by the invention for reduction of multipath signal error.
Figure 6:
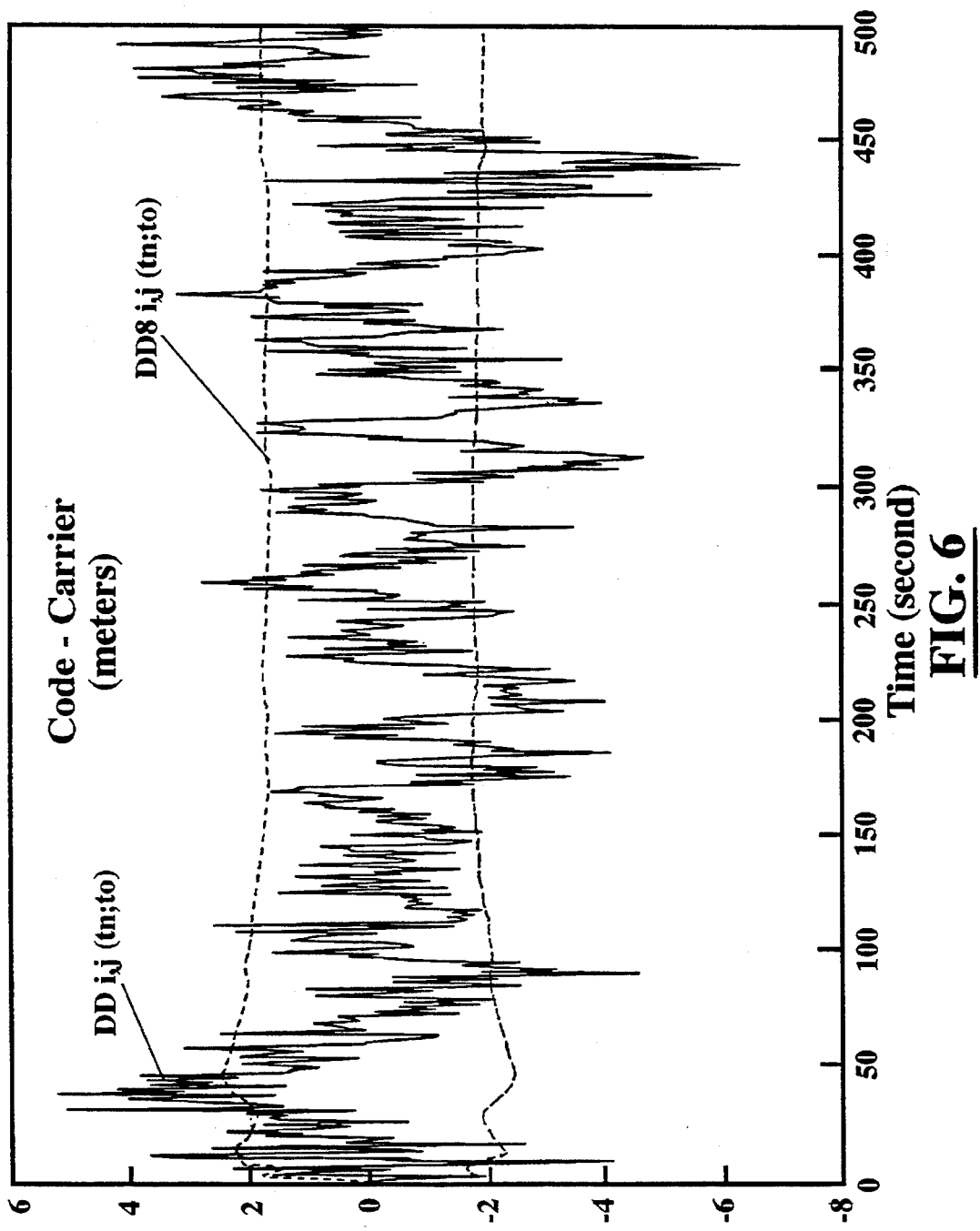

An SATPS difference signal $DD_{i,j}(t_n;t_0)$ is formed and passed through a second SPF 47 having a second selected time constant $\tau 2=5-20$ sec ($\tau 2=6$ sec preferred) to produce an output signal $DD2_{i,j}(t_n;t_0)$ that contains a multipath signal error contribution and a receiver noise error contribution. The difference signal $DD_{i,j}(t_n;t_0)$ is also passed through a third SPF 49 having a third selected time constant $\tau 3=50-500$ sec (with $\tau 3=300$ sec preferred) to produce an output signal $DD3_{i,j}(t_n;t_0)$ that contains a running estimate mean value of the input signal $DD_{i,j}(t_n;t_0)$. Optionally, the square of the input difference signal $DD_{i,j}(t_n;t_0)$ may be formed by a product module 57 and passed through an SPF 59 with a selected time constant $\tau 6$ ($\approx \tau 3$) to produce an output signal $DD8_{i,j}(t_n;t_0)$ that contains a running estimate variance of the input signal $DD_{i,j}(t_n;t_0)$. FIGS. 5 and 6 are graphical view of a typical input signal $DD_{i,j}(t_n;t_0)$ superimposed on the running estimate mean value $DD3_{i,j}(t_n;t_0)$ and the running estimate variance $DD8_{i,j}(t_n;t_0)$, respectively.

The two signals $DD2_{i,j}(t_n;t_0)$ and $DD3_{i,j}(t_n;t_0)$ are received at two input terminals of a first difference module 51, and a difference output signal $$DD4_{i,j}(t_n;t_0)=DD3_{i,j}(t_n;t_0)-DD2_{i,j}(t_n;t_0) \quad (8)$$

is formed that contains primarily the multipath signal error contribution.

The difference signal $DD4_{i,j}(t_n;t_0)$ is subtracted from the original input signal $DD_{i,j}(t_n;t_0)$ in a second difference module 53 to produce a difference output signal $$DD5_{i,j}(t_n;t_0)=DD_{i,j}(t_n;t_0)-DD4_{i,j}(t_n;t_0) \quad (9)$$

that is relatively free of multipath signal error. However, the signal $DD5_{i,j}(t_n;t_0)$ does contain a contribution from receiver noise error. The signal $DD5_{i,j}(t_n;t_0)$ can be characterized as the output signal from a notch frequency filter that eliminates contributions from frequencies in a narrow, sharply defined frequency band centered at a representative multipath frequency to be removed.

Figure 7:
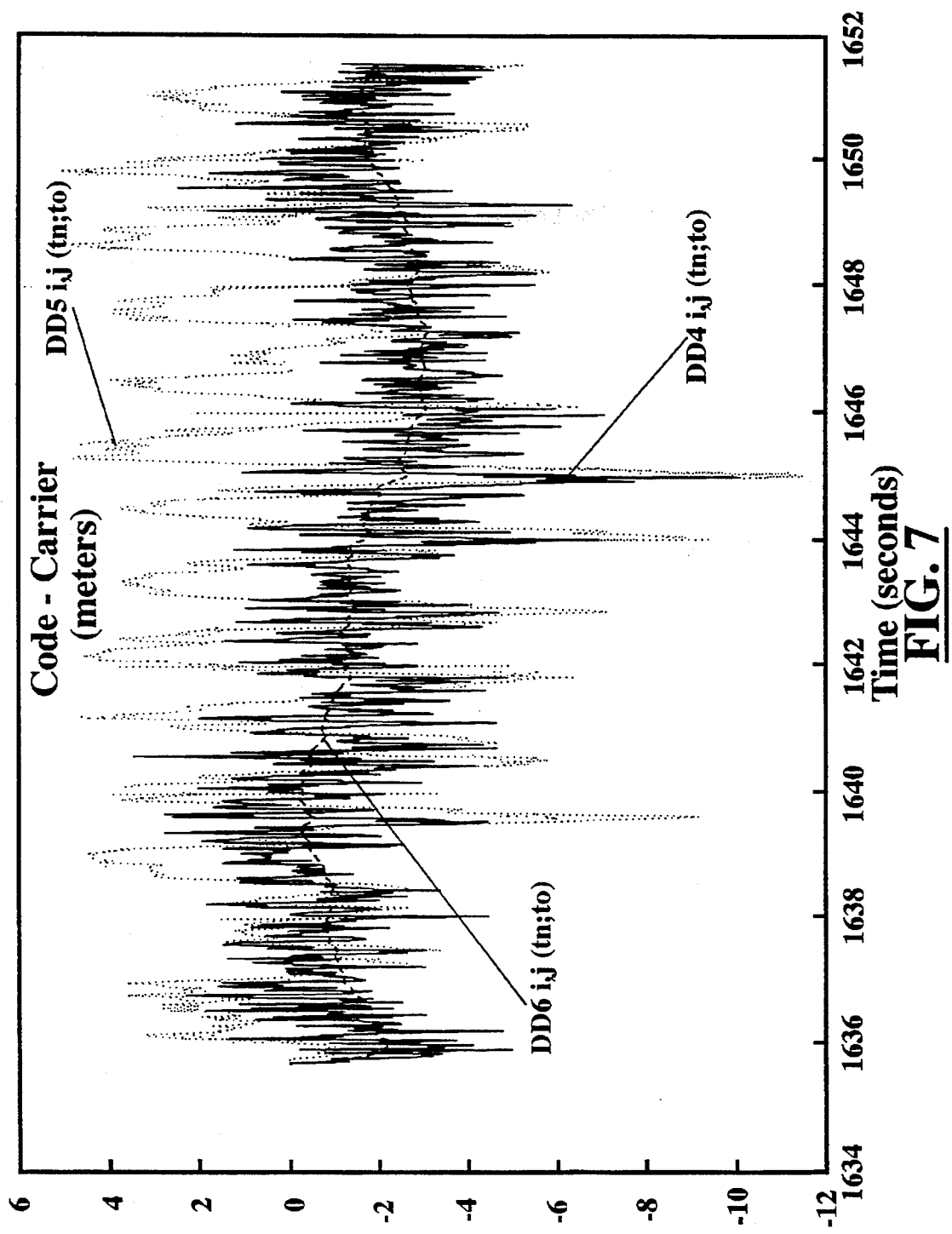
FIG. 7 is a graphical view showing certain intermediate and final SATPS difference signals $DD4_{i,j}(t_n;t_0)$, $DD5_{i,j}(t_n;t_0)$ and $DD6_{i,j}(t_n;t_0)$ produced by the invention for reduction of multipath signal error.

The signal $DD5_{i,j}(t_n;t_0)$ is then passed through a fourth SPF 55 having a selected fourth time constant $\tau 4=50-500$ sec (with $\tau 4 \approx \tau 1$ preferred), to reduce or remove the remaining receiver noise error contribution and to produce a smoothed or filtered output signal $DD6_{i,j}(t_n;t_0)$ that is relatively free of receiver noise error and of signal multipath error. Graphical views of the signals $DD4_{i,j}(t_n;t_0)$, $DD5_{i,j}(t_n;t_0)$ and $DD6_{i,j}(t_n;t_0)$ are presented in FIG. 7.

Optionally, the signal $DD4_{i,j}(t_n;t_0)$ is multiplied by itself in a product module 61 to produce an output signal $(DD4_{i,j}(t_n;t_0))^2$.

Optionally, a squared signal $(DD5_{i,j}(t_n;t_0))^2$ is formed in a product module 63, and is passed through an SPF 65 having a selected time constant $\tau 4$ to produce an output signal $DD9_{i,j}(t_n;t_0)$. The filtered difference signals $DD6_{i,j}(t_n;t_0)$ and $DD9_{i,j}(t_n;t_0)$ represent the running estimate mean and running estimate variance, respectively, of the signal $DD5_{i,j}(t_n;t_0)$. The output signal $DD6_{i,j}(t_n;t_0)$ is relatively free of both multipath signal error and receiver noise error. FIG. 8 is a graphical view of the signals $DD5_{i,j}(t_n;t_0)$ and $DD9_{i,j}(t_n;t_0)$.

For a sequence $\{t_n\}_n$ of signal sampling times, a filtered difference signal, such as $DD6_{i,j}(t_n;t_0)$, is formed using the relations $$DD6_{i,j}(t_n;t_0) = A_n DD5_{i,j}(t_n;t_0) + (1-A_n)D\text{-}D6_{i,j}(t_{n-1};t_0). \quad (10)$$

Figure 9:
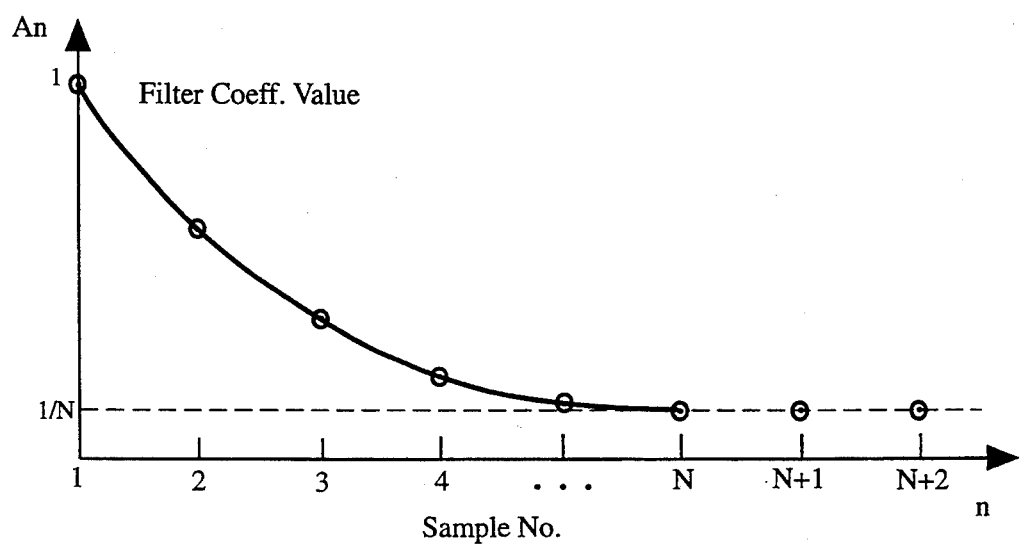
FIG. 9 is a graphical view of one set of statistical processing filter coefficients suitable for filtering certain signals according to the invention.

Here $A_n$ is a filter coefficient, defined as follows in a preferred embodiment of the filter $$\begin{aligned} A_n &= 1/n \, (n = 1, 2, \ldots, N) \\ &= 1/N \, (n > N) \end{aligned} \quad (11)$$

and N is a selected positive integer, as illustrated in FIG. 9. The filter having coefficients defined by Eq. (12) is sometimes referred to as a Morrison filter. A Hatch filter, introduced by R. Hatch in "The Synergism of GPS Code and Carrier Measurements" may also be used here. A Kalman filter may also be used to analyze combined code phase and carrier phase signals, as discussed by P. C. Hwang and R. G. Brown in "GPS Navigation Combining Pseudorange With Continuous Carrier Phase Using a Kalman Filter". In practice, any monotonic sequence of positive filter coefficients $A_n$ satisfying the relations $$0 < A_L = \text{Lim}_m A_m \leq A_n \leq A_{n-1} (n=2, 3, \ldots) \quad (11)$$

can probably be used for the filter coefficients, where this sequence has a finite window width W; such a sequence of filter coefficients is referred to here as a "positive, monotonic, finite width filter set". The integer N in Eq. (11) serves as a measure of the width of the filter window for the Morrison filter. The seven SPFs 43, 45, 47, 49, 55, 59 and 65 may be constructed similarly, but with independently chosen time constants.

For reduction or removal of the multipath signal error, a filter window width $W_{mu}$ in the range $5 \leq W_{mu} \leq 20$ is often suitable, with $W_{mu} = 6$ being a good choice for some applications. For reduction of the receiver noise error, a filter window width $W_\eta$ in the range $50 \leq W_\eta \leq 500$ is often suitable, with $W_\eta = 100$ or 300 being a good choice for some applications. The relevant difference signals are optionally formed in parallel, as indicated in FIG. 2.

Figure 10:
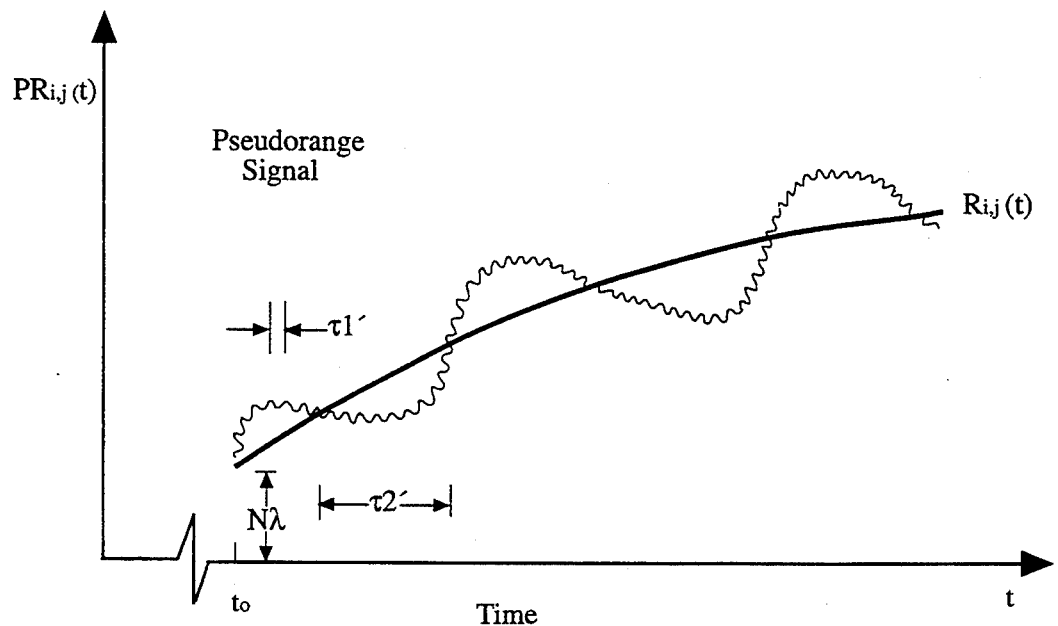
FIG. 10 is a characterizing graphical view of a typical pseudorange signal versus time that is analyzed according to the invention.

FIG. 10 is a graphical view representing a pseudorange signal $PR_{i,j}(t)$ as a function of time, as determined frown SATPS signals, from which error contributions due to clock bias errors and ionospheric and tropospheric propagation delay are removed, received by station i from satellite j, where the heavier solid line $R_{i,j}(t)$ represents the time history of the SATPS range. FIG. 9 illustrates code and carrier phase samples taken at a sampling rate $f_s = 1$ Hz, or at any other convenient sampling rate (0.2-10 Hz). The pseudorange signal $PR_{i,j}(t)$ includes a first oscillation about the SATPS range curve $R_{i,j}(t)$, having a characteristic time period $\approx \tau 2'$ and representing multipath error, superimposed on a second oscillation, having a characteristic time period $\approx \tau 1'$ and representing receiver noise error, where $\tau 2' >> \tau 1'$.

In "Special Committee 104 Recommendations for Differential GPS Service", Navigation, vol. 1, no. 1 (1986), pp. 101-116, R. Kalafus, A. Van Dierendonck and N. Pealer introduce and discuss the User Differential Range Error ("UDRE"), which is a measure of statistical $1\sigma$ differential range error having any of four error ranges, as set forth in Table 1.

TABLE 1

| Code | UDRE No. | UDRE Range (R) |
|---|---|---|
| 00 | 0 | $R \leq 1$ M |
| 01 | 1 | $1$ M $< R \leq 4$ M |
| 10 | 2 | $4$ M $< R \leq 8$ M |
| 11 | 3 | $R > 8$ M |

The quantity UDRE in Table 1 is the square root of the squares of the $1\sigma$ statistical values for the multipath signal error and receiver noise error, regarded as random variables.

$$UDRE = [(1\sigma(\text{multipath}))^2 + (1\sigma(\text{rcvr noise}))^2]^{\frac{1}{2}}. \quad (13)$$

A multiplicative scale factor SF, specified by a scale factor bit and having two values (0.02 and 0.32 for pseudorange corrections; and 0.002 and 0.032 for pseudorange rate corrections) is used to increase the range of the corrections. However, use of a scale factor SF and the increased range of corrections produces reduced resolution for the corrections: 2-32 cm for pseudorange and 0.2-3.2 cm/sec for pseudorange rate.

A first estimate, denoted $UDRE_1$, of a running estimate UDRE may be formed by the combination $$UDRE_1(t_n)^2 = DD7_{i,j}(t_n;t_{n-1}) + (DD4_{i,j}(t_n;t_0))^2, \quad (14)$$

implemented in a module 67 that forms the square root of the sum of two input signals, as indicated in FIG. 2. A second running estimate, denoted $UDRE_2$, of the UDRE may be formed by the combination $$UDRE_2(t_n)^2 = DD9_{i,j}(t_n;t_{n-1}) + (DD4_{i,j}(t_n;t_0))^2, \quad (15)$$

implemented in a module 69 that forms the square root of the sum of two input signals, as indicated in FIG. 2. The output signal $DD8_{i,j}(t_n;t_0)$ serves as a third running estimate, denoted $UDRE_3$, of the UDRE.

Each of these three running estimates of the UDRE is useful in some situations. For example, the estimate $UDRE_2$ would be used for a reference station 13 (FIG. 1) where all SATPS data are filtered and smoothed before such data are transmitted to nearby roving stations 14. If "inverse DSATPS" is implemented, whereby a roving station 14 (FIG. 1) transmits its unfiltered and unsmoothed SATPS measurement or position data to the reference station 13 for determination of corrected location coordinates and/or local time for the roving station, $UDRE_1$ would be a more appropriate estimate of the raw measurement quality of the data received. In certain static or kinematic survey applications, the signal $DD3_{i,j}(t_n;t_0)$ can be used to estimate the initial and running offset values in the pseudorange (code phase) measurement. By linearly combining the signals $DD3_{i,j}(t_n;t_0)$ and $DD4_{i,j}(t_n;t_0)$, a zero means code-carrier difference signal can be produced.

The signals $UDRE_1$, $UDRE_2$ and $UDRE_3$ can be used as weighting factors in a weighted least mean squares filter for navigation algorithms or related algorithms, by providing an estimate of the measurement quality. This information can be used in an "optimum" sense at a reference station, a roving station, or both, depending upon the application. The measurements $DD_{i,j}(t_n;t_0)$ can be corrected using the signal $DD4_{i,j}(t_n;t_0)$ or can be left uncorrected. However, the signal $DD4_{i,j}(t_n;t_0)$ should be provided if weighting coefficients are to be determined.

The estimates $DD1_{i,j}(t_n;t_{n-1})$ and $DD6_{i,j}(t_n;t_0)$ for receiver noise error contribution and multipath signal error contribution determined herein may be applied to the SATPS signal received at any SATPS station and provide signals with significantly reduced UDRE (i.e., increased measurement quality) relative to the respective input signals $DD_{i,j}(t_n;t_{n-1})$ and $DD_{i,j}(t_n;t_0)$. However, it is most appropriate to apply these to the SATPS location information derived at a reference station for use in differential SATPS corrections to be broadcast to other SATPS stations or users. The SATPS signal processing disclosed here involves only formation of signal differences and non-recursive filtering at each of a sequence of signal sampling times. The estimates $DDm_{i,j}(t_n;t_0)$, (m=1, 2, 3, 4, 5, 6, 7, 8, 9) can thus be formed and used in real time. Formation of these estimates is done in parallel for the receiver noise error and multipath signal error contributions, using similar filtering and differencing for these purposes.

An alternative embodiment, also illustrated in FIG. 2, deletes the third SPF 49 and the difference module 51 and forms a new difference signal $$DD6'_{i,j}(t_n;t_0) = DD_{i,j}(t_n;t_0) - DD2_{i,j}(t_n;t_0) \qquad (16)$$

that replaces the difference signal $DD6_{i,j}(t_n;t_0)$. Construction of the signals $DD9_{i,j}(t_n;t_0)$ and $UDRE_m(t_n)$ (m=1, 2, 3) proceeds as discussed above.

A second alternative embodiment replaces the second and third SPFs 47 and 49 by notch filter and deletes the difference module 51, with all other quantities being formally unchanged. A general not-necessarily-symmetric notch filter may be characterized by three parameters, such as the lower break frequency $f_L = 1/\tau_L$, the central break frequency $f_C = 1/\tau_C$(frequency corresponding to the smallest magnitude), and the upper break frequency $f_U = 1/\tau_U$, where $f_C$ lies in the range 50-500 sec ($\tau_C = 300$ sec preferred). The notch filter is briefly discussed in *Operational Amplifiers And Linear Integrated Circuits*, by R. F. Coughlin and F. F. Driscoll, Prentice-Hall, Englewood Cliffs, 1982, pp. 247-252, incorporated by reference herein.

A Satellite Positioning System (SATPS) is a system of satellite signal transmitters, with receivers located on the Earth's surface or adjacent to the Earth's surface, that transmits information from which an observer's present location and/or the time of observation can be determined. Two operational systems, each of which qualifies as an SATPS, are the Global Positioning System and the Global Orbiting Navigational System.

The Global Positioning System (GPS) is part of a satellite-based navigation system developed by the United States Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1 = 1575.42 MHz and an L2 signal having a frequency f2 = 1227.6 MHz. These two frequencies are integral multiples f1 = 1500 f0 and f2 = 1200 f0 of a base frequency f0 = 1.023 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the C/A-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay $\propto f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of 10 f0 = 10.23 MHz. A second PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0 = 1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision A, 26 Sep. 1984, which is incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in Tom Logsdon, *The NAVSTAR Global Positioning System*, Van Nostrand Reinhold, New York, 1992, incorporated by reference herein.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of $f1 = (1.602 + 9\ k/16)$ GHz and $f2 = (1.246 + 7\ k/16)$ GHz, where $k$ ($=0, 1, 2, \ldots, 23$) is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System, such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SATPS. A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual case. Differential positioning can be used for survey or construction work in the field, providing location coordinates and distances that are accurate to within a few centimeters.

In differential position determination, many of the errors in the SATPS that compromise the accuracy of absolute position determination are similar in magnitude for stations that are physically close. The effect of these errors on the accuracy of differential position determination is therefore substantially reduced by a process of partial error cancellation.

I claim:

1. A method for reducing the contributions of receiver noise signal error and multipath signal error from signals received in a Satellite Positioning System (SATPS) from one or more SATPS satellites, the method comprising the steps of:

providing one or more SATPS satellites, numbered $j = 1, 2, \ldots$, each of which broadcasts SATPS signals including indicia that are specific to that satellite;

providing one or more SATPS stations, numbered $i = 1, 2, \ldots$, each SATPS station including an SATPS signal antenna and associated SATPS signal receiver/processor, whose location coordinates are accurately known, that receives from SATPS satellite number j and processes the SATPS signals as pseudorange signals $PR_{i,j}(t)$ and as carrier phase signals $\Phi_{i,j}(t)$ that vary with time t, for a sequence of selected signal sampling times $\{t_n\}_n$;

for a selected time $t_0$ and a subsequent sampling time $t_n$, forming a difference signal $DD_{i,j}(t_n;t_0) = PR_{i,j}(t_n) - PR_{i,j}(t_0) - [\Phi_{i,j}(t_n) - \Phi_{i,j}(t_0)]$;

forming a difference signal $DD_{i,j}(t_n;t_{n-1}) = PR_{i,j}(t_n) - PR_{i,j}(t_{n-1}) - [\Phi_{i,j}(t_n) - \Phi_{i,j}(t_{n-1})]$;

passing the signal $DD_{i,j}(t_n;t_{n-1})$ through a first statistical processing filter having a first selected filter time constant $\tau 1$ that lies in the range 50–500 sec, to produce a first output signal $DD1_{i,j}(t_n;t_{n-1})$;

passing the signal $DD_{i,j}(t_n;t_0)$ through a second statistical processing filter having a second selected filter time constant $\tau 2$ that lies in the range 5–20 sec, to produce a second output signal $DD2_{i,j}(t_n;t_0)$;

passing the signal $DD_{i,j}(t_n;t_0)$ through a third statistical processing filter having a third selected filter time constant $\tau 3$ that lies in the range 50–500 sec to produce a third output signal $DD3_{i,j}(t_n;t_0)$;

forming a difference signal $DD4_{i,j}(t_n;t_0) = DD3_{i,j}(t_n;t_0) - DD2_{i,j}(t_n;t_0)$ as a fourth output signal;

forming a difference signal $DD5_{i,j}(t_n;t_0) = DD_{i,j}(t_n;t_0) - DD4_{i,j}(t_n;t_0)$ as a fifth output signal;

passing the fifth output signal $DD5_{i,j}(t_n;t_0)$ through a fourth statistical processing filter having a fourth selected filter time constant $\tau 4$ that lies in the range 50–500 sec, to produce a sixth output signal $DD6_{i,j}(t_n;t_0)$;

identifying the output signal $DD1_{i,j}(t_n;t_0)$ with an SATPS signal with SATPS receiver noise error reduced or removed; and identifying the output signal $DD6_{i,j}(t_n;t_0)$ with an SATPS signal with SATPS multipath signal error and receiver noise error reduced or removed.

2. The method of claim 1, further comprising the step of choosing at least one of said first, second, third and fourth statistical processing filters from the group consisting of Morrison filters, Hatch filters and Kalman filters.

3. The method of claim 1, further comprising the step of choosing at least one of said first, second, third and fourth statistical processing filters to be a positive, monotonic, finite width filter.

4. The method of claim 1, further comprising the step of forming a signal $(DD_{i,j}(t_n;t_{n-1}))^2$ and passing this signal through a fifth statistical processing filter having a fifth selected filter time constant $\tau 5$ that lies in the range 50–500 sec, to produce a seventh output signal $DD7_{i,j}(t_n;t_{n-1})$.

5. The method of claim 4, further comprising the steps of:

forming a signal $(DD5_{i,j}(t_n;t_0))^2$; and forming a combined signal $[DD7_{i,j}(t_n;t_{n-1})+(DD5_{i,j}(t_n;t_0))^2]^{\frac{1}{2}}$ and identifying this combined signal with a User Differential Range Error signal.

6. The method of claim 4, further comprising the step of choosing said fifth statistical processing filter from the group consisting of Morrison filters, Hatch filters and Kalman filters.

7. The method of claim 4, further comprising the step of choosing said fifth statistical processing filter to be a positive, monotonic, finite width filter.

8. The method of claim 1, further comprising the step of forming a signal $(DD5_{i,j}(t_n;t_0))^2$ and passing this signal through a fifth statistical processing filter having a fifth selected filter time constant $\tau 7$ that lies in the range 50–500 sec, to produce an seventh output signal $DD9_{ij}(t_n;t_0)$.

9. The method of claim 8, further comprising the steps of:

forming a signal $(DD5_{i,j}(t_n;t_0))^2$; and forming a combined signal $[DD9_{i,j}(t_n;t_0)+(DD5_{i,j}(t_n;t_0))^2]^{\frac{1}{2}}$ and identifying this combined signal with a User Differential Range Error signal.

10. The method of claim 8, further comprising the step of choosing said fifth statistical processing filter from the group consisting of Morrison filters, Hatch filters and Kalman filters.

11. The method of claim 8, further comprising the step of choosing said fifth statistical processing filter to be a positive, monotonic, finite width filter.

12. The method of claim 1, further comprising the steps of:

forming a signal $(DD4_{i,j}(t_n;t_0))^2$ and passing this signal through a fifth statistical processing filter having a fifth selected filter time constant $\tau 6$ that lies in the range 50–500 sec, to produce an output signal $DD8_{i,j}(t_n;t_0)$; and identifying the output signal $DD8_{i,j}(t_n;t_0)$ with a User Differential Range Error signal.

13. The method of claim 12, further comprising the step of choosing said fifth statistical processing filter from the group consisting of Morrison filters, Hatch filters and Kalman filters.

14. The method of claim 12, further comprising the step of choosing said fifth statistical processing filter to be a positive, monotonic, finite width filter.

15. The method of claim 1, further comprising the step of choosing said time constant $\tau 1$ to be approximately equal to 100 sec.

16. The method of claim 1, further comprising the step of choosing said time constant $\tau 2$ to be approximately equal to 6 sec.

17. The method of claim 1, further comprising the step of choosing said time constant $\tau 3$ to be approximately equal to 300 sec.

18. A method for reducing the contributions of receiver noise signal error and multipath signal error from signals received in a Satellite Positioning System (SATPS) from one or more SATPS satellites, the method comprising the steps of:

providing one or more SATPS satellites, numbered $j=1, 2, \ldots$, each of which broadcasts SATPS signals including indicia that are specific to that satellite;

providing one or more SATPS stations, numbered $i=1, 2, \ldots$, each SATPS station including an SATPS signal antenna and associated SATPS signal receiver/processor, whose location coordinates are accurately known, that receives from SATPS satellite number j and processes the SATPS signals as pseudorange signals $PR_{i,j}(t)$ and as carrier phase signals $\Phi_{i,j}(t)$ that vary with time t, for a sequence of selected signal sampling times $\{t_n\}_n$;

for a selected time $t_0$ and a subsequent sampling time $t_n$, forming a difference signal $DD_{i,j}(t_n;t_0)=-PR_{i,j}(t_n)-PR_{i,j}(t_0)-[\Phi_{i,j}(t_n)-\Phi_{i,j}(t_0)]$;

forming a difference signal $DD_{i,j}(t_n;t_{n-1})=-PR_{i,j}(t_n)-PR_{i,j}(t_{n-1})-[\Phi_{i,j}(t_n)-\Phi_{i,j}(t_{n-1})]$;

passing the signal $DD_{i,j}(t_n;t_{n-1})$ through a first statistical processing filter having a first selected filter time constant $\tau 1$ that lies in the range 50–500 sec, to produce a first output signal $DD1_{i,j}(t_n;t_{n-1})$;

passing the signal $DD_{i,j}(t_n;t_0)$ through a second statistical processing filter having a second selected filter time constant $\tau 2$ that lies in the range 5–20 sec, to produce a second output signal $DD2_{i,j}(t_n;t_0)$;

forming a difference signal $DD5_{i,j}(t_n;t_0)=-DD_{i,j}(t_n;t_0)-DD2_{i,j}(t_n;t_0)$ as a fifth output signal;

passing the output signal $DD5_{i,j}(t_n;t_0)$ through a third statistical processing filter having a third selected filter time constant $\tau 4$ that lies in the range 50–500 sec, to produce an output signal $DD6_{i,j}(t_n;t_0)$;

identifying the output signal $DD1_{i,j}(t_n;t_0)$ with an SATPS signal with SATPS receiver noise error reduced or removed; and identifying the output signal $DD6_{i,j}(t_n;t_0)$ with an SATPS signal with SATPS multipath signal error and receiver noise error reduced or removed.

19. A method for reducing the contributions of receiver noise signal error and multipath signal error from signals received in a Satellite Positioning System (SATPS) from one or more SATPS satellites, the method comprising the steps of:

providing one or more SATPS satellites, numbered $j=1, 2, \ldots$, each of which broadcasts SATPS signals including indicia that are specific to that satellite;

providing one or more SATPS stations, numbered $i=1, 2, \ldots$, each SATPS station including an SATPS signal antenna and associated SATPS signal receiver/processor, whose location coordinates are accurately known, that receives from SATPS satellite number j and processes the SATPS signals as pseudorange signals $PR_{i,j}(t)$ and as carrier phase signals $\Phi_{i,j}(t)$ that vary with time t, for a sequence of selected signal sampling times $\{t_n\}_n$;

for a selected time $t_0$ and a subsequent sampling time $t_n$, forming a difference signal $DD_{i,j}(t_n;t_0)=-PR_{i,j}(t_n)-PR_{i,j}(t_0)-[\Phi_{i,j}(t_n)-\Phi_{i,j}(t_0)]$;

forming a difference signal $DD_{i,j}(t_n;t_{n-1})=-PR_{i,j}(t_n)-PR_{i,j}(t_{n-1})-[\Phi_{i,j}(t_n)-\Phi_{i,j}(t_{n-1})]$;

passing the signal $DD_{i,j}(t_n;t_{n-1})$ through a first statistical processing filter having a first selected filter time constant $\tau 1$ that lies in the range 50–500 sec, to produce a first output signal $DD1_{i,j}(t_n;t_{n-1})$;

passing the signal $DD_{i,j}(t_n;t_0)$ through a notch filter having a selected filter time constant $f_C=1/\tau_C$ that lies in the range 0.002–0.02 Hz to produce a third output signal $DD3_{i,j}(t_n;t_0)$;

forming a difference signal $DD5_{i,j}(t_n;t_0)=-DD_{i,j}(t_n;t_0)-DD3_{i,j}(t_n;t_0)$ as an output signal;

passing the fifth output signal $DD5_{i,j}(t_n;t_0)$ through a fourth statistical processing filter having a fourth selected filter time constant $\tau 4$ that lies in the range 50–500 sec, to produce an output signal $DD6_{i,j}(t_n;t_0)$;

identifying the output signal $DD1_{i,j}(t_n;t_0)$ with an SATPS signal with SATPS receiver noise error reduced or removed; and identifying the output signal $DD6_{i,j}(t_n;t_0)$ with an SATPS signal with SATPS multipath signal error and receiver noise error reduced or removed.

* * * * *